(12) United States Patent
Che et al.

(10) Patent No.: US 11,685,667 B2
(45) Date of Patent: Jun. 27, 2023

(54) METHOD FOR PURIFYING FERRIC CHLORIDE

(71) Applicants: 3R Environmental Technology Co., Ltd., Huizhou (CN); Tangshan 3R Chemical Co., Ltd., Tangshan (CN)

(72) Inventors: Ying Che, Huizhou (CN); Kaijing He, Huizhou (CN); Jinhua Liang, Huizhou (CN); Maojie Liang, Huizhou (CN); Haixiong Chen, Huizhou (CN)

(73) Assignees: 3R ENVIRONMENTAL TECHNOLOGY CO., LTD., Huizhou (CN); TANGSHAN 3R CHEMICAL CO., LTD., Tangshan (CN)

( * ) Notice: Subject to any disclaimer, the term of this patent is extended or adjusted under 35 U.S.C. 154(b) by 191 days.

(21) Appl. No.: 17/357,944

(22) Filed: Jun. 24, 2021

(65) Prior Publication Data

US 2022/0204358 A1 Jun. 30, 2022

(30) Foreign Application Priority Data

Dec. 29, 2020 (CN) .......................... 202011590582.5

(51) Int. Cl.
*C01G 49/00* (2006.01)
*C01G 49/10* (2006.01)

(52) U.S. Cl.
CPC ......... *C01G 49/10* (2013.01); *C01G 49/0009* (2013.01); *C01P 2006/80* (2013.01)

(58) Field of Classification Search
CPC .. C01G 49/10; C01G 49/0009; C01P 2006/80
See application file for complete search history.

(56) References Cited

U.S. PATENT DOCUMENTS 3,394,060 A * 7/1968 Ellwood ................ C01G 49/10
205/498

FOREIGN PATENT DOCUMENTS

| CN | 110 902 727 A | * | 3/2020 | |
|---|---|---|---|---|
| CN | 110 980 833 A | * | 4/2020 | |
| CN | 111 153 439 A | * | 5/2020 | ............ Y02P 20/584 |
| CN | 112 062 164 A | * | 12/2020 | ............ C01G 49/10 |
| CN | 112 661 196 A | * | 4/2021 | ............ C01G 49/10 |

* cited by examiner

*Primary Examiner* — Timothy C Vanoy
(74) *Attorney, Agent, or Firm* — Matthias Scholl P.C.; Matthias Scholl

(57) ABSTRACT

A method for purifying ferric chloride, the method including: 1) adding an oxidant to an aqueous solution of an iron-containing chloride for oxidation of $Fe^{2+}$, to yield a ferric chloride solution; 2) adding industrial hydrochloric acid and butyl acetate to the ferric chloride solution, shaking and resting a mixture of the ferric chloride solution, the industrial hydrochloric acid, and butyl acetate for phase separation, to yield an organic phase and an aqueous phase; 3) adding a stripping agent to the organic phase, shaking, and resting a mixture of the stripping agent and the organic phase; and collecting an aqueous phase including ferric chloride; and 4) evaporating and concentrating the aqueous phase including ferric chloride, removing butyl acetate, to yield purified ferric chloride.

9 Claims, No Drawings

METHOD FOR PURIFYING FERRIC CHLORIDE

CROSS-REFERENCE TO RELATED APPLICATIONS

Pursuant to 35 U.S.C. § 119 and the Paris Convention Treaty, this application claims foreign priority to Chinese Patent Application No. 202011590582.5 filed Dec. 29, 2020, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of chemistry, and more particularly, to a method for purifying ferric chloride (iron (III) chloride).

Iron(III) chloride is an inorganic compound with the formula $FeCl_3$, also called ferric chloride, and mainly used in metal etching, sewage treatment, printing industry for etching rotogravure cylinders, circuit boards, construction industry for the preparation of concrete, inorganic industry for the manufacture of iron salts and inks, dyestuff industry as oxidants, organic industry as catalysts, oxidants and chlorination agents, and so on.

Conventionally, high-purity iron is mixed with industrial hydrochloric acid to produce high-purity ferric chloride. However, the method is costly, and produces hydrogen gas as byproduct, which may be undesired on a large scale because of its flammability and possibility of explosion when mixed with air.

Conventional purification methods of iron-containing chloride include recrystallization, replacement of metal impurities by elemental iron, reduction of solution acidity to form hydroxide precipitate, removal of metals by sulfide, and extraction. The former four purification methods require raw materials with low impurities to improve the purity of final products and reduce the purification cost, which is a complex process and limited by the purity of the raw materials. Few of iron extractants exhibits a single extraction characteristic for iron ion, and most of the extractants (such as tributyl phosphate) or diluents (such as benzene and toluene) are toxic and environmentally unfriendly.

SUMMARY

The disclosure provides a method for purifying ferric chloride, the method comprising:
1) adding an oxidant to an aqueous solution of an iron-containing chloride for oxidation of $Fe^{2+}$, to yield a ferric chloride solution;
2) adding industrial hydrochloric acid and butyl acetate to the ferric chloride solution, shaking and resting a mixture of the ferric chloride solution, the industrial hydrochloric acid, and butyl acetate for phase separation, to yield an organic phase and an aqueous phase;
3) adding a stripping agent to the organic phase, shaking, and resting a mixture of the stripping agent and the organic phase; and collecting an aqueous phase comprising ferric chloride; and
4) evaporating and concentrating the aqueous phase comprising ferric chloride, removing butyl acetate, to yield purified ferric chloride.

In a class of this embodiment, in 1), the iron-containing chloride is ferrous chloride, ferric chloride, or a mixture thereof; the oxidant is oxygen, air, ozone, sodium chlorate, hydrogen peroxide, chlorine, or a mixture thereof.

Because $Fe^{2+}$ is not complexed with $Cl^-$ and cannot be extracted by butyl acetate, it is necessary to oxidize $Fe^{2+}$ in the chloride. A method to determine whether $Fe^{2+}$ is oxidized completely includes but is not limited to potassium dichromate method and potassium ferricyanide method.

In a class of this embodiment, in 2), the volume ratio of the ferric chloride solution to the industrial hydrochloric acid to butyl acetate is 1: 2-6:1-4.

In extraction, when the proportion of the organic phase is too high, emulsification is easy to occur, resulting in incomplete phase separation, slow phase separation speed and even no phase separation; when the proportion of the organic phase is too low, the extraction stages need to be increased to improve the extraction efficiency of iron. Therefore, to facilitate the complete extraction of iron, the volume ratio of the aqueous phase to the organic phase is between 1.5:1 and 3:1, particularly between 2:1 and 2.5:1.

Free $Fe^{2+}$ cannot be extracted by butyl acetate, so that high concentration hydrochloric acid is added to assist $Fe^{2+}$ and $Cl^-$ to complex into $(FeCl_4)^-$ which is extractable by butyl acetate. To keep the singleness of iron extraction, it is necessary to keep the solution with high acidity. When the acidity of the aqueous phase is low, metal impurities other than iron will be extracted into the organic phase, which is not conducive to the purification of ferric chloride. The experimental results show when the acidity in the solution is not less than 6 mol/L, the single extraction of $(FeCl_4)^-$ by butyl acetate is ensured.

In a class of this embodiment, in 2), the organic phase is extracted repeatedly to saturate the iron therein, and then stripped, thus increasing the concentration of ferric chloride in the stripping solution and saving the evaporation cost. For example, when the iron concentration in the organic phase is 9.3% after the first stage extraction, the iron concentration in the organic phase can be increased to 11.2% after the organic phase is extracted once more. The multi-stage extraction of the aqueous phase in 2) is conducive to the transfer of ferric chloride into the organic phase, and the impurities remain in the aqueous phase, thus achieving the separation of ferric chloride and impurities, and the extraction separation rate can be more than 99.99%. According to the theoretical knowledge of extraction, at a certain temperature, when a solute reaches equilibrium in the two-phase solvent (water/organic phase), the concentration ratio of the solute in the two phases is a constant, which is called equilibrium constant. Therefore, the theory can be used to extract ferric chloride from organic phase for many times to increase the content of iron in the organic phase and then increase the concentration of ferric chloride in the stripping solution.

In a class of this embodiment, in 3), the stripping agent is pure water or a 0.5-1 wt. % hydrochloric acid aqueous solution, particularly, 0.5 wt. % hydrochloric acid aqueous solution. There is a certain acidity in the water phase, thus preventing the generation and hydrolysis of ferric hydroxide in the subsequent evaporation process.

In a class of this embodiment, in 4), the aqueous phase comprising ferric chloride is heated and boiled for 10-15 min, to completely remove the organic matter (that is, butyl acetate) in the stripping solution. The total organic carbon (TOC) in the stripping solution was not detected. The operation can increase the product concentration and remove the organic matter in ferric chloride. The condensed water produced by evaporation can be collected and reused in 3) as a stripping agent.

The following advantages are associated with the method for purifying ferric chloride (iron(III) chloride) of the disclosure:

1. Based on the singleness of extraction of ferric chloride by butyl acetate in high concentration hydrochloric acid system, the method of purifying ferric chloride is not limited by the purity of raw materials. The purity of ferric chloride is high, the impurities of heavy metals are less than 3 ppm, and most toxic and harmful metals are less than 1 ppm.

2. Through multistage extraction, $FeCl_3$ in the water phase can be completely transferred to the organic phase, so that $FeCl_3$ can be separated from impurities, and the extraction separation efficiency is more than 99.99%.

3. The organic phase after first-stage extraction can be extracted one or two times, so that the iron concentration is increased by about 20%. In the stripping stage, the iron concentration in the aqueous phase can be increased to more than 11%, thus reducing the evaporation and concentration cost of $FeCl_3$.

4. Butyl acetate is nontoxic and easy to volatilize, and has no adverse effect on the quality of ferric chloride products.

5. There is no emission of wastewater and waste gas in the production process, which is environmentally friendly.

DETAILED DESCRIPTION

To further illustrate, embodiments detailing a method for purifying ferric chloride (iron(III) chloride) are described below. It should be noted that the following embodiments are intended to describe and not to limit the disclosure.

Example 1

The disclosure provides a method for purifying ferric chloride (iron(III) chloride), which is carried out as follows:

1) 1 kg of ferrous chloride solution $A_0$ was chlorinated with chlorine until $Fe^{2+}$ was completely oxidized, to yield a ferric chloride solution;

2) 3 kg of industrial hydrochloric acid and 2 kg of butyl acetate were added to the ferric chloride solution; the resulting mixture was shaken and rested for phase separation, and an organic phase was obtained;

3) 1 kg of pure water was added to the organic phase for stripping; the resulting solution was rested for phase separation; an aqueous phase comprising ferric chloride and small impurities was obtained, and the organic phase was returned to the extraction equipment for recycling; and 4) the aqueous phase comprising ferric chloride and small impurities was boiled and evaporated for 10 min, to yield high-purity ferric chloride A.

The experimental data is shown in Table 1, in which the detection limit of total organic carbon (TOC) detector is 3 mg/L:

TABLE 1

| Product index | Ferrous chloride solution $A_0$ | High-purity ferric chloride A |
|---|---|---|
| Fe, % | 14.2 | 9.26 |
| HCl, % | 2.21 | 0.31 |
| Cu, ppm | 3689 | 1.18 |
| Ni, ppm | 2217 | Not detected (<0.1) |
| Zn, ppm | 4324 | 2.86 |

TABLE 1-continued

| Product index | Ferrous chloride solution $A_0$ | High-purity ferric chloride A |
|---|---|---|
| Cr, ppm | 5658 | 1.66 |
| Mn, ppm | 7869 | 0.82 |
| TOC, mg/L | Not detected (<3 mg/L) | Not detected (<3 mg/L) |

Example 2

The disclosure provides a method for purifying ferric chloride (iron(III) chloride), which is carried out as follows:

1) 2 kg of ferrous chloride solution $A_0$ was chlorinated with chlorine until $Fe^{2+}$ was completely oxidized, to yield a ferric chloride solution;

2) 3 kg of industrial hydrochloric acid and 2 kg of butyl acetate were added to 1 kg of the ferric chloride solution; the resulting mixture was shaken and rested for phase separation, and a first organic phase was obtained;

3) 1 kg of the ferric chloride and 3 kg of industrial hydrochloric acid were added to the first organic phase, shaken, and rested for phase separation, and a second organic phase was obtained;

4) 1 kg of pure water was added to the second organic phase for stripping; the resulting solution was rested for phase separation, yielding a first aqueous phase $B_1$ comprising ferric chloride and small impurities, and a third organic phase; 1 kg of pure water was added to the third organic phase for stripping; the resulting mixture was rested for phase separation, yielding a second aqueous phase $C_1$ comprising ferric chloride and ultralow impurities, and a fourth organic phase; the fourth organic phase was returned to the extraction equipment for recycling; and 5) the first aqueous phase $B_1$ comprising ferric chloride and small impurities and the second aqueous phase $C_1$ comprising ferric chloride and ultralow impurities were boiled and evaporated for 15 min, to yield high-purity ferric chloride B, high-purity ferric chloride C, respectively.

The experimental data is shown in Table 2:

TABLE 2

| Product index | Ferrous chloride solution $A_0$ | High-purity ferric chloride B | High-purity ferric chloride C |
|---|---|---|---|
| Fe, % | 14.2 | 11.18 | 7.27 |
| HCl, % | 2.21 | 0.32 | 0.20 |
| Cu, ppm | 3689 | 1.25 | Not detected (<0.1) |
| Ni, ppm | 2217 | Not detected (<0.1) | Not detected (<0.1) |
| Zn, ppm | 4324 | 2.65 | 0.24 |
| Cr, ppm | 5658 | 1.54 | Not detected (<0.1) |
| Mn, ppm | 7869 | 0.97 | 0.13 |
| TOC, mg/L | Not detected (<3 mg/L) | Not detected (<3 mg/L) | Not detected (<3 mg/L) |

Example 3

The disclosure provides a method for purifying ferric chloride (iron(III) chloride), which is carried out as follows:

1) 1 kg of ferrous chloride solution $A_0$ was mixed with appropriate sodium chlorate and hydrochloric acid until $Fe^{2+}$ was completely oxidized, to yield a ferric chloride solution;

2) 2 kg of industrial hydrochloric acid and 1 kg of butyl acetate were added to the ferric chloride solution; the resulting mixture was shaken and rested for phase separation, and an organic phase was obtained;

3) 1 kg of pure water was added to the organic phase for stripping; the resulting solution was rested for phase separation; an aqueous phase Di comprising ferric chloride and small impurities was obtained, and the organic phase was returned to the extraction equipment for recycling; and 4) the aqueous phase Di comprising ferric chloride and small impurities was boiled and evaporated for 15 min, to yield high-purity ferric chloride D.

The experimental data is shown in Table 3:

TABLE 3

| Product index | Ferrous chloride solution $A_0$ | High-purity ferric chloride A |
|---|---|---|
| Fe, % | 14.2 | 9.17 |
| HCl, % | 2.21 | 0.24 |
| Cu, ppm | 3689 | 1.12 |
| Ni, ppm | 2217 | Not detected (<0.1) |
| Zn, ppm | 4324 | 2.65 |
| Cr, ppm | 5658 | 1.72 |
| Mn, ppm | 7869 | 0.86 |
| TOC, mg/L | Not detected (<3 mg/L) | Not detected (<3 mg/L) |

Example 4

The disclosure provides a method for purifying ferric chloride (iron(III) chloride), which is carried out as follows:

1) 1 kg of a mixed solution Ai comprising ferrous chloride and ferric chloride was mixed with appropriate sodium chlorate and hydrochloric acid until $Fe^{2+}$ was completely oxidized, to yield a ferric chloride solution;

2) 4 kg of industrial hydrochloric acid and 3 kg of butyl acetate were added to the ferric chloride solution; the resulting mixture was shaken and rested for phase separation, and an organic phase was obtained;

3) 1 kg of 0.5% dilute acid water was added to the organic phase for stripping; the resulting solution was rested for phase separation; an aqueous phase E comprising ferric chloride and small impurities, and the organic phase was returned to the extraction equipment for recycling; and 4) the aqueous phase E comprising ferric chloride and small impurities was boiled and evaporated for 30 min, to yield high-purity ferric chloride F.

The experimental data is shown in Table 4:

TABLE 4

| Product index | Mixed solution $A_1$ comprising ferrous chloride and ferric chloride | Aqueous phase E comprising ferric chloride and small impurities | High-purity ferric chloride F |
|---|---|---|---|
| Fe, % | 15.34 | 11.26 | 14.82 |
| HCl, % | 1.28 | | 0.58 |
| Cu, ppm | 5879 | | 0.63 |
| Ni, ppm | 4346 | | Not detected (<0.1) |
| Zn, ppm | 6362 | | 1.21 |
| Cr, ppm | 8394 | | Not detected (<0.1) |
| Cd, ppm | 1.82 | | 0.02 |
| As, ppm | 3.2 | | 0.011 |
| Pb, ppm | 3.68 | | 0.06 |
| Hg, ppm | 0.63 | | 0.002 |
| Co, ppm | 3.66 | | 0.09 |
| V, ppm | 1.38 | | 0.06 |
| Sn, ppm | 1.96 | | 0.10 |
| Na, ppm | 14.3 | 4.82 | 5.8 |
| Mg, ppm | 26.7 | | 1.2 |
| K, ppm | 32.8 | | 2.3 |
| Ca, ppm | 53.9 | | 2.6 |
| Mn, ppm | 8682 | | 1.02 |
| TOC, mg/L | Not detected | 486 | Not detected |
| Ferrous (Fe), % | 6.21 | <0.01 | <0.01 |
| Sulfate ($SO_4$), % | >0.1 | — | ≤0.01 |
| Nitrate ($NO_3$), % | >0.1 | — | ≤0.01 |
| Phosphate ($PO_4$), % | >0.1 | — | ≤0.01 |

Example 5

The disclosure provides a method for purifying ferric chloride (iron(III) chloride), which is carried out as follows:

1) 1 kg of a mixed solution Ai comprising ferrous chloride and ferric chloride was mixed with appropriate sodium chlorate and hydrochloric acid until $Fe^{2+}$ was completely oxidized, to yield a ferric chloride solution;

2) 6 kg of industrial hydrochloric acid and 4 kg of butyl acetate were added to the ferric chloride solution; the resulting mixture was shaken and rested for phase separation, and an organic phase was obtained;

3) 1 kg of 0.5% dilute acid water was added to the organic phase for stripping; the resulting solution was rested for phase separation; an aqueous phase comprising ferric chloride and small impurities, and the organic phase was returned to the extraction equipment for recycling; and 4) the aqueous phase comprising ferric chloride and small impurities was boiled and evaporated for 60 min, to yield high-purity ferric chloride G.

The experimental data is shown in Table 5:

TABLE 5

| Product index | Mixed solution $A_1$ comprising ferrous chloride and ferric chloride | High-purity ferric chloride G |
|---|---|---|
| Fe, % | 15.34 | 14.82 |
| HCl, % | 1.28 | 0.58 |
| Cu, ppm | 5879 | 0.63 |
| Ni, ppm | 4346 | Not detected (<0.1) |
| Zn, ppm | 6362 | 1.21 |
| Cr, ppm | 8394 | Not detected (<0.1) |
| Cd, ppm | 1.82 | 0.02 |
| As, ppm | 3.2 | 0.011 |
| Pb, ppm | 3.68 | 0.06 |
| Hg, ppm | 0.63 | 0.002 |
| Co, ppm | 3.66 | 0.09 |
| V, ppm | 1.38 | 0.06 |
| Sn, ppm | 1.96 | 0.10 |
| Na, ppm | 14.3 | 5.8 |
| Mg, ppm | 26.7 | 1.2 |
| K, ppm | 32.8 | 2.3 |
| Ca, ppm | 53.9 | 2.6 |
| Mn, ppm | 8682 | 1.02 |
| TOC, mg/L | Not detected | Not detected |
| Ferrous (Fe), % | 6.21 | <0.01 |

TABLE 5-continued

| Product index | Mixed solution $A_1$ comprising ferrous chloride and ferric chloride | High-purity ferric chloride G |
|---|---|---|
| Sulfate (SO$_4$), % | >0.1 | ≤0.01 |
| Nitrate (NO$_3$), % | >0.1 | ≤0.01 |
| Phosphate (PO$_4$), % | >0.1 | ≤0.01 |

As shown in the experimental data of Examples 1-5, when the raw materials contain much more heavy metal impurities, for example, Cu, Ni, Zn, Cr and Mn, through controlling the usage amount of hydrochloric acid and butyl acetate, the metal impurities can be completely separated from the solution by butyl acetate extraction, and the organic matter residual (that is, butyl acetate) in ferric chloride after stripping can be removed by evaporation. The purified and concentrated ferric chloride can meet the requirements of drinking water treatment, pharmaceutical intermediates, analytical testing and precision etching industry.

Effect of Solution Acidity on the Single Extraction of Iron with Butyl Acetate $Fe^{2+}$ can be completely complexed by 3.6 mol/L hydrochloric acid. Therefore, the test starts with 4 mol/L, and the industrial hydrochloric acid is generally 10-11 mol/L.

10 mL of FeCl$_3$ sample was mixed with hydrochloric acid and water to form 30 mL of FeCl$_3$ solution with an acidity of 4, 5, 6, 7, 8, 9 mol/L, respectively, first extracted with 18 mL of butyl acetate and then stripped with 10 mL of water. Thereafter, the aqueous phase was measured, and the experimental data is shown in Table 6:

TABLE 6

| Product index | Raw materials | Acidity, mol/L | | | | | |
|---|---|---|---|---|---|---|---|
| | | 4 | 5 | 6 | 7 | 8 | 9 |
| Cu, ppm | 4698 | 83 | 22 | 1.3 | 1.6 | 1.5 | 1.00 |
| Ni, ppm | 5543 | 46 | 13 | Not detected | Not detected | Not detected | 0.13 |
| Zn, ppm | 8657 | 97 | 34 | 2.1 | 2.3 | 1.8 | 2.0 |
| Cr, ppm | 6692 | 65 | 18 | Not detected | Not detected | 0.21 | Not detected |
| Mn, ppm | 9264 | 78 | 21 | 0.95 | 0.86 | 0.77 | 1.23 |
| Cd, ppm | 2.64 | 0.22 | 0.09 | 0.02 | 0.01 | 0.02 | 0.03 |
| As, ppm | 3.39 | 0.34 | 0.07 | 0.03 | 0.03 | 0.04 | 0.02 |
| Pb, ppm | 4.26 | 0.54 | 0.11 | 0.02 | 0.03 | 0.02 | 0.01 |
| Hg, ppm | 0.89 | 0.12 | 0.02 | 0.01 | 0.005 | 0.003 | 0.006 |
| Co, ppm | 4.26 | 0.54 | 0.11 | 0.04 | 0.02 | 0.03 | 0.05 |
| V, ppm | 3.17 | 0.66 | 0.08 | 0.06 | 0.03 | 0.04 | 0.08 |
| Sn, ppm | 2.62 | 0.32 | 0.06 | 0.05 | 0.02 | 0.01 | 0.02 |
| Na, ppm | 4899 | 24 | 7.3 | 2.5 | 2.7 | 1.8 | 2.2 |
| Mg, ppm | 268 | 11 | 5.2 | 2.2 | 2.9 | 1.6 | 2.1 |
| K, ppm | 683 | 30 | 6.6 | 4.6 | 3.8 | 2.5 | 3.1 |
| Ca, ppm | 1597 | 12 | 8.2 | 5.1 | 4.6 | 6.1 | 4.3 |
| Sulfate (SO$_4$), % | 1 | 0.08 | 0.05 | <0.01 | <0.01 | <0.01 | <0.01 |
| Nitrate (NO$_3$), % | 1 | 0.05 | 0.03 | <0.01 | <0.01 | <0.01 | <0.01 |
| Phosphate (PO$_4$), % | 1 | 0.05 | 0.03 | <0.01 | <0.01 | <0.01 | <0.01 |

As shown in Table 6, when the acidity of the solution is low, butyl acetate can extract a small amount of metal impurities. When the acidity of the solution is more than 6 mol/L, ferric chloride can be purified better.

In the disclosure, hydrochloric acid is added to improve the acidity of the solution, thus improving the single extraction of (FeCl$_4$)$^-$ through butyl acetate. After detection, nearly 20 kinds of metal impurities are removed one time, and a variety of toxic and harmful impurity metals can be reduced to less than 1 ppm, which can meet the requirements of various high-purity ferric chloride, such as precision etching, drinking water treatment, pharmaceutical intermediates, and analysis and testing. The method involves simple equipment, is free from the purity of raw materials, the extractant can be reused, and the purification cost is relatively low.

It will be obvious to those skilled in the art that changes and modifications may be made, and therefore, the aim in the appended claims is to cover all such changes and modifications.

What is claimed is:

1. A method, comprising:
   1) adding an oxidant to an aqueous solution of an iron-containing chloride for oxidation of $Fe^{2+}$, to yield a ferric chloride solution;
   2) adding industrial hydrochloric acid and butyl acetate to the ferric chloride solution, shaking and resting a mixture of the ferric chloride solution, the industrial hydrochloric acid, and butyl acetate for phase separation, to yield an organic phase and an aqueous phase;
   3) adding a stripping agent to the organic phase, shaking, and resting a mixture of the stripping agent and the organic phase; and collecting an aqueous phase comprising ferric chloride; and
   4) evaporating and concentrating the aqueous phase comprising ferric chloride, removing butyl acetate, to yield purified ferric chloride.

2. The method of claim 1, wherein in 1), the iron-containing chloride is ferrous chloride, ferric chloride, or a mixture thereof.

3. The method of claim 1, wherein in 1), the oxidant is oxygen, air, ozone, sodium chlorate, hydrogen peroxide, chlorine, or a mixture thereof.

4. The method of claim 1, wherein in 2), a volume ratio of the ferric chloride solution to the industrial hydrochloric acid to butyl acetate is 1: 2-6:1-4.

5. The method of claim 4, wherein in 2), a hydrochloric acid concentration of the mixture of the ferric chloride solution, the industrial hydrochloric acid, and butyl acetate is not less than 6 mol/L.

6. The method of claim 1, wherein in 2), the organic phase is extracted repeatedly to improve iron concentration therein.

7. The method of claim 1, wherein in 2), the aqueous phase is extracted for 3-5 stages to allow iron in the aqueous phase to enter the organic phase.

8. The method of claim 1, wherein in 3), the stripping agent is pure water or a 0.5-1 wt. % hydrochloric acid aqueous solution.

9. The method of claim 1, wherein in 4), the aqueous phase comprising ferric chloride is evaporated and concentrated at a temperature no less than 80° C. for at least 10 min.

* * * * *